US008688353B2

(12) United States Patent
Morimoto et al.

(10) Patent No.: US 8,688,353 B2
(45) Date of Patent: Apr. 1, 2014

(54) ENGINE CONTROL SYSTEM WITH ALGORITHM FOR ACTUATOR CONTROL

(75) Inventors: Youhei Morimoto, Kariya (JP); Koji Ishizuka, Chita-gun (JP); Yoshimitsu Takashima, Anjo (JP); Kazuhiro Higuchi, Ichinomiya (JP); Sumitaka Ikeda, Anjo (JP); Mitsuhiro Nishimura, Chiryu (JP); Masahiro Asano, Kariya (JP); Satoru Sasaki, Kariya (JP)

(73) Assignee: DENSO Corporation, Kariya (JP)

( * ) Notice: Subject to any disclaimer, the term of this patent is extended or adjusted under 35 U.S.C. 154(b) by 380 days.

(21) Appl. No.: 12/917,658

(22) Filed: Nov. 2, 2010

(65) Prior Publication Data

US 2011/0106408 A1 May 5, 2011

(30) Foreign Application Priority Data

Nov. 2, 2009 (JP) ................................ 2009-251864

(51) Int. Cl.
*G06F 17/00* (2006.01)

(52) U.S. Cl.
USPC .......................................... 701/103; 701/102

(58) Field of Classification Search
USPC .......... 701/102, 104, 109, 114, 115; 123/486, 123/568.21, 674
See application file for complete search history.

(56) References Cited

U.S. PATENT DOCUMENTS

| | | | | |
|---|---|---|---|---|
| 6,928,361 | B2 * | 8/2005 | Nakayama et al. | 701/104 |
| 6,994,077 | B2 * | 2/2006 | Kobayashi et al. | 123/568.11 |
| 2005/0229903 | A1 | 10/2005 | Kobayashi | |
| 2008/0228383 | A1 | 9/2008 | Nakagawa et al. | |
| 2008/0314369 | A1 * | 12/2008 | Takakura et al. | 123/520 |
| 2009/0164090 | A1 * | 6/2009 | Yasui et al. | 701/102 |
| 2009/0198430 | A1 * | 8/2009 | Yasui et al. | 701/102 |

FOREIGN PATENT DOCUMENTS

| | | | |
|---|---|---|---|
| CN | 1478198 A | | 2/2004 |
| CN | 100414085 C | | 8/2008 |
| JP | 2002-138889 | | 5/2002 |
| JP | 2005-248703 | | 9/2005 |
| JP | 2006-144639 | | 6/2006 |
| JP | 2007-077935 | | 3/2007 |
| JP | 2007-113485 | | 5/2007 |
| JP | 2008-223643 | | 9/2008 |
| JP | 2009203955 A | * | 9/2009 |
| WO | 02/37076 | | 5/2002 |

OTHER PUBLICATIONS

Ri et al., JP2009203955_fulltrans, Sep. 2009.*

(Continued)

*Primary Examiner* — Stephen K Cronin
*Assistant Examiner* — Elizabeth Hadley
(74) *Attorney, Agent, or Firm* — Nixon & Vanderhye, P.C.

(57) ABSTRACT

An engine control apparatus which may be employed in automotive vehicles. The engine control apparatus is equipped with a controlled variable arithmetic expression which defines correlations between a plurality of combustion parameters and a plurality of controlled variables of actuators for control of an operation of the engine to calculate a combination of command values to be outputted to the actuators for regulating the controlled variables needed to achieve target values of the combustion parameters. When one of the command values is produced outside an allowable operation range of a corresponding one of the actuators, the engine control apparatus corrects or limits the one of the command values to an upper or a lower limit of the allowable operation range, thereby ensuring the stability in bringing engine output characteristics close to desired values.

2 Claims, 7 Drawing Sheets

(56) References Cited

OTHER PUBLICATIONS

Japanese Office Action dated Aug. 30, 2011, issued in corresponding Japanese Application No. 2009-251864 with English Translation.

Office Action (7 pgs.) dated Feb. 16, 2013 issued in corresponding Chinese Application No. 201010534987.7 with an at least partial English-language translation thereof (5 pgs.).

* cited by examiner

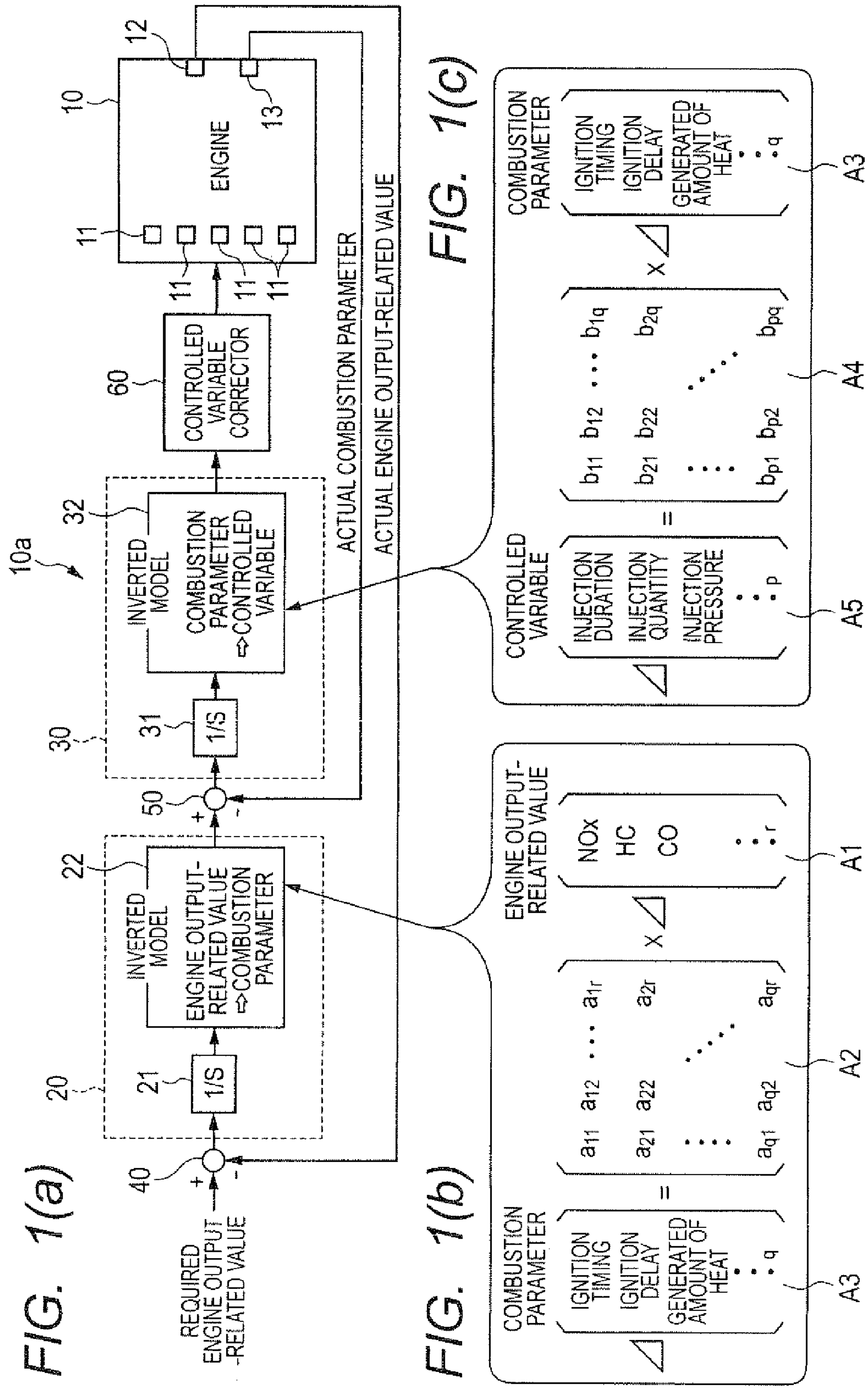

FIG. 1(b)

$$\Delta\begin{pmatrix}\text{IGNITION TIMING}\\ \text{IGNITION DELAY}\\ \text{GENERATED AMOUNT OF HEAT}\\ \vdots\ q\end{pmatrix} = \begin{pmatrix} a_{11} & a_{12} & \cdots & a_{1r}\\ a_{21} & a_{22} & & a_{2r}\\ \vdots & & \ddots & \\ a_{q1} & a_{q2} & & a_{qr}\end{pmatrix} \times \Delta\begin{pmatrix}NOx\\ HC\\ CO\\ \vdots\ r\end{pmatrix}$$

FIG. 1(c)

$$\Delta\begin{pmatrix}\text{INJECTION DURATION}\\ \text{INJECTION QUANTITY}\\ \text{INJECTION PRESSURE}\\ \vdots\ p\end{pmatrix} = \begin{pmatrix} b_{11} & b_{12} & \cdots & b_{1q}\\ b_{21} & b_{22} & & b_{2q}\\ \vdots & & \ddots & \\ b_{p1} & b_{p2} & & b_{pq}\end{pmatrix} \times \Delta\begin{pmatrix}\text{IGNITION TIMING}\\ \text{IGNITION DELAY}\\ \text{GENERATED AMOUNT OF HEAT}\\ \vdots\ q\end{pmatrix}$$

t1
t2
t3
t4
t5
WITH GUARD
W
NOx
REQUIRED VALUE
WITHOUT GUARD

CO
WITH GUARD
W
REQUIRED VALUE
WITHOUT GUARD

EGR RATE
G1 (LOWER LIMIT)

PILOT INJECTION QUANTITY

PILOT INJECTION TIMING
G2 (UPPER LIMIT)

MAIN INJECTION TIMING

INJECTION PRESSURE
G3 (UPPER LIMIT)
0
20
40
60
80
TIME [sec.]

ENGINE CONTROL SYSTEM WITH ALGORITHM FOR ACTUATOR CONTROL

CROSS REFERENCE TO RELATED DOCUMENT

The present application claims the benefit of priority of Japanese Patent Application No. 2009-251864 filed on Nov. 2, 2009, the disclosures of which are incorporated herein by reference.

BACKGROUND OF THE INVENTION

1. Technical Field of the Invention

The present invention relates generally to an engine control system which may be employed in automotive vehicles and is designed to use an algorithm to control operations of actuators such as a fuel injector and an EGR (Exhaust Gas Recirculation) valve to regulate a combustion condition of fuel in an internal combustion engine and also to control output characteristics of the engine.

2. Background Art

Engine control systems are known which determine controlled variables such as the quantity of fuel to be injected into an engine (which will also be referred to as an injection quantity), the injection timing, the amount of a portion of exhaust gas to be returned back to the inlet of the engine (which will also be referred to as an EGR amount below), the boost pressure, the amount of intake air, the ignition timing, and an open/close timing of intake and exhaust valves to bring an engine output-related value such as the amount of exhaust emissions, for example, NOx or CO, the torque outputted by the engine, or the specific fuel consumption (or fuel efficiency) into agreement with a required value.

Most of the engine control systems are equipped with a control map which stores optimum values of, for example, a target quantity of fuel to be injected into the engine for respective required engine output-related values. The control map is usually made by adaptability tests performed by an engine manufacturer. The engine control systems work to calculate the controlled variable needed to meet the required engine output-related value using the control map and output a command signal to a corresponding actuator to achieve the controlled variable.

The making of the control map usually requires a huge number of adaptability tests, so that the adaptability tests consume a significant amount of time in total. The adaptability test work and map-making work, therefore, impose a heavy burden on control system manufacturers. Particularly, when the control map is made with respect to each of environmental conditions such as the temperature of engine coolant and the outdoor air temperature, it requires a large number of adaptability tests which will constitute a great burden on the control system manufacturers.

The adaptability tests are usually performed for each of the different engine output-related values. This is likely to result in interference between the different types of controlled variables in that when one of the engine output-related values reaches its required value, another engine output-related value deviates from its required value, while when the another engine output-related value is brought to the required value, the previously mentioned one of the engine output-related values deviates from the required one. It is, therefore, very difficult to bring the different types of engine output-related values into agreement with target values simultaneously.

Japanese Patent First Publication Nos. 2008-223643 and 2007-77935 disclose engine control systems which calculate a target value of pressure in a cylinder of the engine (i.e., a combustion parameter) based on a value of torque the engine is required to output and adjust the open/close timing of the intake and exhaust valves and the quantity of fuel to be injected into the engine (i.e., controlled variables of actuators) so as to bring the in-cylinder pressure into agreement with the target value.

The above engine control systems, however, also need to experimentally sample optimum values of the in-cylinder pressure for respective required values of output torque of the engine through the adaptability tests to make the control map, which will consume lots of time. The engine control systems also face the problem on the interference between the different types of controlled variables in that when an actual output torque of the engine reaches a required value, another engine output-related value such as the amount of NOx deviates from a target value, while when the another engine output-related value reaches the target value, the actual output torque deviates from the required value. It is, thus, difficult to bring the different types of engine output-related values into agreement with target values simultaneously.

The engine control systems of the above publications also have the following problem. Each of the actuators usually has an allowable operation range. For instance, a minimum possible amount of fuel the fuel injector can spray in a single injection event depends upon a limit of the speed at which the fuel injector is to be opened or closed. Consequently, even when the engine control systems output a command value to instruct the fuel injectors to spray less than the minimum possible amount, the fuel injectors will spray the minimum possible amount of fuel. Additionally, when the amount of fuel to be sprayed in the pilot injection event prior to the main injection event is increased excessively in a multi-injection mode in which the fuel is sprayed several times in each engine operating cycle (i.e., a four-stroke cycle) including intake or induction, compression, combustion, and exhaust, it may cause the amount of exhaust smoke to exceed an allowable value. It is, thus, necessary to give an upper limit to the amount of fuel to be sprayed in the pilot injection event. When the command values produced in the above-mentioned engine control systems are to instruct the fuel injectors to spray an amount of fuel which are outside the upper or lower limit (i.e., the allowable operation range, it may cause the engine output-related values to deviate from required values greatly.

Further, when it is required to operate the actuators to regulate the engine output-related values in response to a change in temperature of coolant for the engine, the limitation to the operation of the actuators within the allowable operation ranges may result in a failure in bringing the engine output-related values into agreement with required values, respectively.

SUMMARY OF THE INVENTION

It is therefore a principal object of the invention to provide an engine control apparatus constructed to decrease a burden on the adaptability test work and map-making work and improve the controllability in bringing a plurality of engine output-related values into agreement with required or target values simultaneously.

It is another object of the invention to an engine control apparatus designed to bring engine output-related values closer to required values even when a controlled variable of an actuator is limited to an allowable operation range.

According to one aspect of the invention, there is provided an engine control apparatus which may be employed in automotive vehicles. The engine control apparatus comprises: (a)

a combustion target value calculator which calculates target values of a plurality of types of combustion parameters associated with combustion conditions of an internal combustion engine based on a plurality of types of engine output-related values representing output characteristics of the internal combustion engine; (b) a storage device which stores therein a controlled variable arithmetic expression defining correlations between the combustion parameters and a plurality of controlled variables of actuators which work to control the combustion conditions of the internal combustion engine; (c) a controlled variable command value calculator which uses the controlled variable arithmetic expression to calculate a combination of command values which correspond to the target values of the combustion parameters, as derived by said combustion target value calculator, the command values being provided to adjust controlled variables of the actuators for achieving desired values of the output characteristics of the internal combustion engine; (d) a combustion parameter feedback circuit working to determine deviations of actual or calculated values of the combustion parameters from the target values thereof for use in calculating the command values in said controlled variable command value calculator in a feedback mode; and (e) a controlled variable corrector working to correct at least one of the command values, as derived by said controlled variable command value calculator, which lies out of a given allowable operation range of a corresponding one of the actuators to one of an upper and a lower limit of the allowable operation range.

The actual values of the combustion parameters may be measured by directly by sensors. The calculated values of the combustion parameters may be derived mathematically by models.

The controlled variable arithmetic expression, as described above, defines the correlations between the combustion parameters and the controlled variables of the actuators. The agreement of actual values of the combustion parameters with target values thereof may, therefore, be achieved by controlling the operations of the actuators to achieve the required values of the controlled variables, as derived by substituting the target values of the combustion parameters into the controlled variable arithmetic expression. In other words, the controlled variable arithmetic expression expresses how to operate the actuators to meet desired combustion conditions of the engine. The target values of the combustion parameters are, therefore, achieved by determining the command values based on values calculated from the controlled variable arithmetic expression and outputting the command values to the actuators. The controlled variable arithmetic expression may be implemented by a determinant, as illustrated in FIG. 1(*c*), or a model, as illustrated in FIG. 1(*a*).

The controlled variable arithmetic expression may define the correlations of the ignition timing, the ignition delay, etc., (i.e., the combustion parameters) and the injection quantity, the EGR amount, the supercharging pressure, etc. (i.e., the controlled variables). In other words, the controlled variable arithmetic expression does not define a one-to-one correspondence between, for example, the ignition timing and the injection quantity, but shows how to select a combination of, for example, the injection quantity, the EGR amount, and the supercharging pressure to meet all the target values of the ignition timing and the ignition delay.

Basically, the controlled variable arithmetic expression is made to define a given number of or all possible combinations of the controlled variables with the combustion parameters which are needed to achieve the target values of the combustion parameters.

The engine control apparatus, as described above, works to use the controlled variable arithmetic expression to calculate a combination of the command values for the controlled variables which corresponds to target values of the combustion parameters, thus eliminating the need for finding relations of optimum values of the controlled variables to the combustion parameters through the adaptability tests, which results in a decrease in burden of the adaptability test work and the map-making work on manufacturers.

If the command values for the controlled variables in relation to the combustion parameters are determined independently of each other, it may result in the following mutual interference. Specifically, when one of the combustion parameters which corresponds to the command value for one of the controlled variables has reached a target value thereof, another combustion parameter deviates from a target value thereof, while when the another combustion parameter is brought into agreement with the target value thereof, the one of the combustion parameters deviates from the target value thereof. In contrast, the engine control apparatus calculates a combination of the command values for the controlled variables which correspond to target values of the combustion parameters and controls the operation of the actuators based on the combination of the command values, thus avoiding the deterioration of the controllability arising from the mutual interference between the combustion parameters and attaining the simultaneous agreement of the combustion parameters with the target values thereof, which results in an improvement of the controllability of the engine control apparatus.

The combustion parameter feedback circuit and the controlled variable corrector provide the following beneficial effects.

Each of the actuators usually has an allowable operation range. For instance, a minimum possible amount of fuel a fuel injector of the engine can spray in a single injection event depends upon a limit of speed at which the fuel injector is to be opened or closed. Consequently, even when the engine control apparatus outputs the command value to instruct the fuel injector to spray less than the minimum possible amount, the fuel injector will spray the minimum possible amount of fuel. Additionally, when the amount of fuel to be sprayed in the pilot injection event prior to the main injection event is increased excessively in a multi-injection mode in which the fuel is sprayed several times in each engine operating cycle including intake or induction, compression, combustion, and exhaust, it may cause the amount of exhaust smoke to exceed an allowable value. It is, thus, necessary to give an upper limit to the amount of fuel to be sprayed in the pilot injection event.

There is a concern that the command value for the controlled variable, as derived through the controlled variable arithmetic expression, lie out of the allowable operation range. In order to alleviate such a concern, the engine control apparatus works to limit the command value for the controlled variable which is produced by the controlled variable calculator and lies out of the allowable operation range to the upper or lower limit of the allowable operation range through the controlled variable corrector.

When one of the controlled variables is limited to within the allowable operation range, it will result in increased deviations of actual or calculated values of the combustion parameters from target values thereof. The combustion parameter feedback circuit then works to update or correct the controlled variables so as to minimize the deviations. This may cause the controlled variable which has already been limited to within the allowable operation range to be corrected outside the allowable operation range, but it is limited to within the allowable operation range again. The correction of the other controlled variables which are not yet limited to within the allowable operation ranges thereof may cause one or some of them to fall outside the allowable operation ranges thereof. These some controlled variables are then limited to within the allowable operation ranges thereof. In this manner, the engine output-related values are brought close to the required values thereof.

If one of the actuators has failed in operation thereof, so that it is difficult to adjust a corresponding one of the controlled variables to the command value thereof, the combustion parameter feedback circuit, like the above case where the controlled variable(s) is limited to within the allowable operation range thereof, works to correct all the controlled variables so as to minimize deviations of actual or calculated values of the combustion parameters from target values thereof. The correction of the controlled variables of the actuators which are now operating properly serves to bring all the engine output-related values close to required values thereof.

In the preferred mode of the invention, the storage device also stores therein a combustion parameter arithmetic expression defining correlations between the engine output-related values and the combustion parameters. The combustion target value calculator uses the combustion parameter arithmetic expression to calculate a combination of the target values of the combustion parameters which correspond to required values of the engine output-related values.

The combustion parameter arithmetic expression, as described above, defines the correlations between the engine output-related values and the combustion parameters. The agreement of actual values of the engine output-related values with required values thereof may, therefore, be achieved by bringing the combustion conditions of the internal combustion engine toward values of the combustion parameters, as derived by substituting the required values of the engine output-related values into the combustion parameter arithmetic expression. In other words, the combustion parameter arithmetic expression describes relationships of the combustion conditions in which the internal combustion engine is to be placed to the engine output-related values. The required values of the engine output-related values are, therefore, achieved by determining values calculated from the combustion parameter arithmetic expression as the target values of the combustion parameters and controlling operations of the actuators to meet the target values. The combustion parameter arithmetic expression may be implemented by a determinant, as illustrated in FIG. 1(*b*), or a model, as illustrated in FIG. 1(*a*).

The combustion parameter arithmetic expression may define the correlations between, for example, the amount of NOx, the amount of PM (Particulate Matter), the output torque of the engine, etc. (i.e. the engine output-related values) and, for example, the ignition timing, the ignition delay, etc. (i.e., the combustion parameters). In other words, the combustion parameter arithmetic expression does not define a one-to-one correspondence between the engine output and the ignition timing, but defines a combination of values of the ignition timing and the ignition delay which are needed to meet the required values of all the output torque, the amount of NOx, and the amount of PM.

Basically, the combustion parameter arithmetic expression is made to define a given number of all possible combinations of the combustion parameters (e.g., the ignition timing and the ignition delay) with the engine output-related values (e.g., the output torque, the amount of NOx, and the amount of PM) which are needed to achieve the required values of the engine output-related values.

The engine control apparatus of the invention, as described above, works to use the combustion parameter arithmetic expression to calculate a combination of target values of the combustion parameters which correspond to required values of the engine output-related values and calculate the command values for the actuators which are required to meet the combination of the target values. This eliminates, unlike in the publications, as referred to in the introductory part of this application, the need for finding relations of optimum values of the combustion parameters to the engine output-related values through the adaptability tests, thus decreasing a burden of the adaptability test work and the map-making work on manufacturers of the engine control apparatus.

If target values of the combustion parameters in relation to the engine output-related values are determined independently of each other, it may result in the following mutual interference. Specifically, when one of the engine output-related values which corresponds to the target value of one of the combustion parameters reaches its required value, another engine output-related value deviates from its required value, while when another engine output-related value is brought into agreement with its required value, the previously mentioned one of the engine output-related values deviates from its required value. It is, therefore, very difficult to bring the different types of engine output-related values into agreement with target values simultaneously. In contrast, the engine control apparatus of this invention calculates a combination of target values of the combustion parameters which correspond to required values of the engine output-related values and controls the operations of the actuators so as to achieve the target values, thus avoiding the deterioration of the controllability arising from the mutual interference between the combustion parameters and attaining the simultaneous agreement of the engine output-related values with the required values thereof, which results in an improvement of the controllability of the engine control apparatus.

The engine control apparatus also works to use the combustion parameter arithmetic expression and the controlled variable arithmetic expression to define the correlations between the engine output-related values and the combustion parameters and between the combustion parameters and the controlled variables, thereby figuring out how to operate the actuators to derive desired combustion conditions of the engine and finding the combustion conditions in relation to the output conditions of the engine. This means that the combustion parameters are used as intermediate parameters to obtain the correlations between the engine output-related values and the controlled variables.

The simultaneous agreement of the engine output-related values with the required values thereof is, therefore, achieved by calculating target values of the combustion parameters based on required values of the engine output-related values through the combustion parameter arithmetic expression, producing command values for the controlled variables which correspond to the calculated target values through the controlled variable arithmetic expression, and controlling the operations of the actuators through the command values.

The engine control apparatus may further comprise an engine output feedback control circuit which feeds deviations of actual or calculated values of the engine output-related values from the required values thereof back to calculation of the target values of the combustion parameters. The actual values of the engine output-related values may be measured directly by sensors. The calculated values of the engine output-related values may be derived by models.

The correlations of the combustion conditions (i.e., the combustion parameters) to the output conditions (i.e., engine output-related values) of the engine will change with a change in environmental condition such as the temperature of coolant of the engine or the outside air temperature. The correction of the target values, as derived by the combustion parameter arithmetic expression for each environmental condition, requires the adaptability tests to predetermine amounts by which the target values are to be corrected. This results in an increase in burden of the adaptability test work and the map-making work on the manufacturers.

In order to avoid the above drawback, the engine control apparatus of the invention calculates the target values of the combustion parameters so as to eliminate the deviations of the actual or calculated values of the engine output-related values from the required values thereof in the feedback mode, so that the target values are derived which accommodate the change in environmental condition. This eliminates the need for the adaptability tests to find the amounts of correction, thus resulting in a decrease in burden of the adaptability test work and the map-making work on the manufacturers.

The engine output-related values may represent at least two of a physical quantity associated with an exhaust emission from the internal combustion engine, a physical quantity associated with an output torque of the internal combustion engine, a physical quantity associated with a fuel consumption, and a physical quantity associated with combustion noise of the internal combustion engine.

For instance, the physical quantity associated with the exhaust emission is the amount of NOx, the amount of PM, the amount of CO, or the amount of HC. The physical quantity associated with the output torque of the engine is the torque outputted from the engine itself or the speed of the engine. The physical quantity associated with the combustion noise is a combustion noise itself or mechanical vibrations of the engine. Such various kinds of physical quantities may be exemplified as the engine output-related values and broken down roughly into the exhaust emission, the output torque, the fuel consumption, and the combustion noise. These four kinds of engine output-related values are disposed to interfere with each other. The engine control apparatus is, therefore, very effective in treating such engine output-related values.

The engine output-related values may also include at least two of the amount of NOx, the amount of CO, the amount of HC, and the amount of black smoke. The engine output-related values associated with such exhaust emissions are more likely to have the tradeoff relationship. The engine control apparatus is, therefore, effective in treating such engine output-related values.

The combustion parameters may include the ignition timing and the ignition delay. Such kinds of combustion parameters are typical physical quantities representing the combustion conditions in a cylinder of the engine and related closely with each other. The use of the combustion parameter arithmetic expression and the controlled variable arithmetic expression, therefore, minimizes the mutual interference between such combustion parameters.

The controlled variables may include at least two of the injection quantity of fuel, the injection timing of fuel, the number of injections of fuel, the supply pressure of fuel, the EGR amount, the supercharging pressure, and the open/close timing of intake or exhaust valve. Such controlled variables are typical variables used in the engine control system and more likely to interfere mutually with each other. The use of the controlled variable arithmetic expression, therefore, minimizes the mutual interference between such controlled variables.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1(*a*) is a block diagram which shows an engine control system according to the first embodiment;

FIG. 1(*b*) is an illustration which represents a determinant used as a combustion parameter arithmetic expression;

FIG. 1(*c*) is an illustration which represents a determinant used as a controlled variable arithmetic expression;

FIG. 3(*b*) is an illustration which exemplifies the correlation, as defined by the controlled variable arithmetic expression of FIG. 3(*a*);

FIG. 3(*c*) is an illustration which exemplifies the correlation, as defined by the combustion parameter arithmetic expression of FIG. 3(*a*);

FIG. 5(*b*) is a view which exemplifies a change in temperature of coolant of an internal combustion engine;

FIG. 5(*c*) is a view which exemplifies changes in combustion parameters;

FIG. 5(*d*) is a view which exemplifies changes in engine output-related values;

FIG. 6(*b*) is a view which exemplifies a change in required value of amount of CO;

FIG. 6(*c*) is a view which exemplifies correction of an EGR rate in a feedback mode;

FIG. 6(*d*) is a view which exemplifies correction of a pilot injection quantity in a feedback mode;

FIG. 6(*e*) is a view which exemplifies correction of a pilot injection timing in a feedback mode;

FIG. 6(*f*) is a view which exemplifies correction of a main injection timing in a feedback mode;

FIG. 6(*g*) is a view which exemplifies correction of an injection pressure in a feedback mode.

DESCRIPTION OF THE PREFERRED EMBODIMENTS

Figure 2:
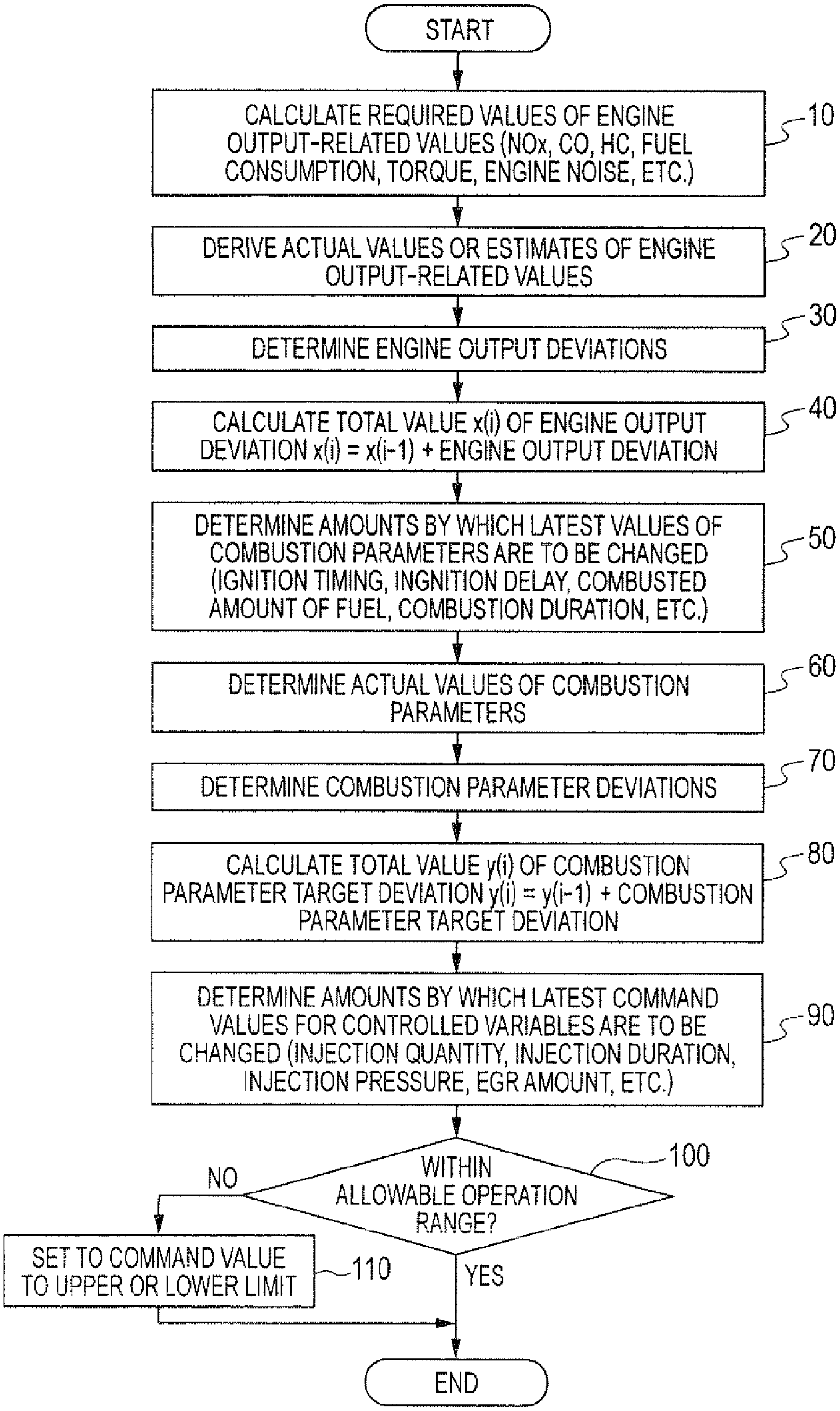
FIG. 2 is a flowchart of an engine control program to be executed by the engine control system of FIG. 1(*a*)

Referring to the drawings, wherein like reference numbers refer to like parts in several views, particularly to FIG. 1(*a*), there is shown an engine control system according to the first embodiment which is designed to control an operation of an internal combustion engine 10 for automotive vehicles. The following discussion will refer to, as an example, a selfignition diesel engine in which fuel is sprayed into four cylinders #1 to #4 at a high pressure.

FIG. 1(*a*) is a block diagram of the engine control system implemented by an electronic control unit (ECU) 10*a* which works to control operations of a plurality of actuators 11 to regulate fuel combustion conditions of the engine 10 for bringing output characteristics of the engine 10 into agreement with desired ones.

The actuators 11 installed in a fuel system are, for example, fuel injectors which spray fuel into the engine 10 and a high-pressure pump which controls the pressure of fuel to be fed to the fuel injectors. The ECU 10*a* works to calculate a command value representing a target controlled variable, i.e., a target amount of fuel to be sucked and discharged by the high-pressure pump and output it in the form of a command signal to the high-pressure pump to control the pressure of fuel to be sprayed into the engine 10. The ECU 10*a* also determines command values representing target controlled variables, i.e., a target quantity of fuel to be sprayed from each of the fuel injectors (i.e., an injection duration), a target injection timing at which each of the fuel injectors is to start to spray the fuel, and the number of times each of the fuel injectors is to spray the fuel in each engine operating cycle (i.e., a four-stroke cycle) including intake or induction, compression, combustion, and exhaust and output them in the form of command signals to the fuel injectors.

The actuators 11 installed in an inlet system are, for example, an EGR (Exhaust Gas Recirculation) valve which controls the amount of a portion of exhaust gas emitted from the engine 10 to be returned back to an inlet port of the engine 10 (which will also be referred to as an EGR amount below), an operation of a variably-controlled supercharger which regulates the supercharging pressure variably, an operation of a throttle valve which controls the quantity of fresh air to be inducted into the engine 10, and an operation of a valve control mechanism which sets open and close timings of intake and exhaust valves of the engine 10 and regulates the amount of lift of the take and exhaust valves. The ECU 10*a* works to calculate command values representing target controlled variables, i.e., target values of the EGR amount, the supercharging pressure, the quantity of fresh air, the open and close timings, and the amount of lift of the intake and exhaust valves and output them in the form of command signals to the EGR valve, the variably-controlled supercharger, the throttle valve, and the valve control mechanism, respectively.

In the way as described above, the ECU 10*a* controls the operations of the actuators 11 to achieve the target controlled variables, thereby controlling the combustion condition in the engine 10 to bring the output characteristics of the engine 10 into agreement with desired ones.

The combustion conditions of the engine 10, as referred to above, are defined by a plurality of types of combustion parameters that are ones of, for example, an ignition timing, an ignition delay that is the time required between when the fuel starts to be sprayed and when the fuel starts to be ignited, etc. Such combustion parameters are physical quantities which are usually measured by, for example, a cylinder pressure sensor which measures the pressure in the cylinder of the engine 10.

The output characteristics of the engine 10, as referred to above, are expressed by a plurality of types of engine output-related values that are ones of, for example, a physical quantity associated with exhaust emissions (e.g., the amount of NOx, the amount of PM (Particulate Matter), and the amount of CO or HC), a physical quantity associated with torque outputted from the engine 10 (e.g., the torque of an output shaft of the engine 10) and the speed of the engine 10, a physical quantity associated with a fuel consumption in the engine 10 (e.g., a travel distance per consumed volume of fuel or a consumed volume per running time of the engine 10, as measured through mode running tests, and a physical quantity associated with combustion noise (e.g., engine vibrations or combustion or exhaust noise).

The ECU 10*a* is equipped with a typical microcomputer including a CPU performing operations on given tasks, a RAM serving as a main memory storing therein data produced during the operations of the CPU or results of the operations of the CPU, a ROM serving as a program memory, an EEPROM storing data therein, and a backup RAM to which electric power is supplied at all the time from a backup power supply such as a storage battery mounted in the vehicle even after a main electric power source of the ECU 10*a* is turned off.

The engine 10 has installed therein sensors 12 and 13 which provide outputs to the ECU 10*a*. The sensors 12 are engine output sensors functioning as a portion of an engine output-related value feedback circuit to measure the engine output-related values actually. For example, the engine output sensors 12 are implemented by a gas sensor which measures the concentration of a component (e.g., NOx) of exhaust emissions from the engine 10, a torque sensor which measures the torque outputted by the engine 10, and a noise sensor which measures the magnitude of noise arising from the combustion of fuel in the engine 10. As will be described later, the actual values of the engine output-related values may alternatively be calculated or estimated using algorithmic models without use of the sensor 12.

The sensor 13 are combustion condition sensors serving as a portion of a combustion parameter feedback circuit to determine the combustion parameters actually. For example, the sensors 13 are implemented by a cylinder pressure sensor which measures the pressure in the combustion chamber (i.e., the cylinder) of the engine 10 and an ion sensor which measures the quantity of ion, as produced by the burning of fuel in the engine 10. For example, the ECU 10*a* calculates a change in pressure in the combustion chamber of the engine 10, as measured by the cylinder pressure sensor 13, to determine both the ignition timing and the ignition delay. The actual values of the combustion parameters may alternatively be calculated or estimated using an algorithmic model without use of the sensors 13.

The ECU 10*a* includes a combustion parameter calculator 20, a combustion parameter controller 30, an engine output deviation calculator 40, a combustion parameter deviation calculator 50, and a controlled variable corrector 60. The combustion parameter calculator 20 serves as a combustion target value calculator to determine the combustion conditions of the engine 10 (i.e., target values of the combustion parameters) needed to bring the engine output-related values into agreement with required ones. The combustion parameter controller 30 serves as a controlled variable command calculator to control the operations (i.e., the controlled variables) of the actuators 11 to achieve target combustion conditions of the engine 10. The combustion parameter controller 30 produces a command value representing a target value of each of the controlled variables and outputs it in the form of a command signal to a corresponding one of the actuators 11. The engine output deviation calculator 40 serves as an engine output feedback circuit to calculate a difference or deviation of an actual value of each of the engine output-related values (i.e., the outputs from the engine output sensors 12) from a required value thereof. The combustion parameter deviation calculator 50 serves as a combustion parameter feedback circuit to calculate a difference or deviation of an actual value of each of the combustion parameters (i.e., the output from the combustion condition sensor(s) 13) from a target value thereof. The controlled variable corrector 60 works to set the command values, as outputted from the combustion parameter controller 30, to fall within allowable operation ranges of the actuators 11, respectively. These circuits 20 to 50 are implemented by function blocks in the microcomputer of the ECU 10*a*.

Specifically, the combustion parameter calculator 20 has an integrator 21 and a combustion parameter arithmetic expression 22. The integrator 21 works to sum or totalize each of the engine output deviations, as calculated by the engine output deviation calculator 40. The combustion parameter arithmetic expression 22 is stored in a memory such as the ROM of the ECU 10*a*.

The combustion parameter arithmetic expression 22 is made to define correlations between the different types of engine output-related values and the different types of combustion parameters. Specifically, the combustion parameter arithmetic expression 22 is provided by an engine output-to-combustion parameter model, as illustrated in FIG. 1(*a*), or a determinant, as illustrated in FIG. 1(*b*), and to mathematically express relations of the combustion conditions of the engine 10 (i.e., the combustion parameters) to the output conditions of the engine 10 (i.e., the engine output-related values). In other words, the combustion parameter arithmetic expression 22 produces values of the combustion conditions of the engine 10 needed to meet the required values of the engine output-related values. Target values of the combustion parameters (or amounts by which the target values, as derived in the previous control cycle, are required to be changed) are obtained by substituting required values of the engine output-related values (or the deviations of the actual values from the required values) into the combustion parameter arithmetic expression 22.

The combustion parameter calculator 20 having the structure of FIG. 1(*a*) substitutes the deviations of the engine output-related values (i.e., differences between the actual values of the engine output-related values from the required values thereof) into the combustion parameter arithmetic expression 22 to determine amounts by which the target values of the combustion parameters, as set in the previous control cycle, are required to be changed in this control cycle.

In practice, the integrator 21 totalizes the deviations of the actual values of the engine output-related values, respectively and substitutes them into the combustion parameter arithmetic expression 22 to minimize the possibility that the actual values of the engine output-related values will deviate from the required values thereof constantly. When the total value of the deviation becomes zero (0), a corresponding value, as calculated by the combustion parameter arithmetic expression 22, will be zero. The target values of the combustion parameters are, therefore, so set as to keep the combustion conditions of the engine 10 as they are.

The combustion parameter controller 30 includes an integrator 31 and a controlled variable arithmetic expression 32. The integrator 31 works to sum or totalize the deviation of the actual value of each of the combustion parameters from the target value thereof, as derived by the combustion parameter deviation calculator 50. The controlled variable arithmetic expression 32 is stored in a memory (i.e., a storage device) such as the ROM of the ECU 10*a*.

The controlled variable arithmetic expression 32 is made to define correlations between the different types of combustion parameters and the different types of controlled variables. The controlled variable arithmetic expression 32 is provided by a combustion parameter-to-controlled variable model, as illustrated in FIG. 1(*a*), or a determinant, as illustrated in FIG. 1(*c*) and mathematically express values of the controlled variables corresponding to desired combustion conditions of the engine 10. In other words, the controlled variable arithmetic expression 32 provides a combination of values of the controlled variables needed to place the engine 10 in target combustion conditions. The command values for the controlled variables (or amounts by which the command values are to be changed) are, therefore, obtained by substituting target values of the combustion parameters (or amounts by which the target values are to be changed) into the combustion parameter arithmetic expression 32.

The combustion parameter deviation calculator 30 of the structure of FIG. 1(*a*) substitutes the combustion parameter deviations (i.e., the amounts by which the target values are required to be changed) into the controlled variable arithmetic expression 32 to determine amounts by which the command values, as derived in the previous control cycle, are needed to be changed in this control cycle in order to derive amounts by which the controlled variables provided in the previous control cycle are required to be changed in this control cycle.

In practice, the integrator 31 integrates or totalizes the deviations of the actual values of the combustion parameters from the target values thereof, as derived by the combustion parameter deviation calculator 50 and substitutes them into the controlled variable arithmetic expression 32, respectively, to minimize the possibility that the actual values of the combustion parameters will deviate from the target values thereof constantly. When the total value of each of the deviations becomes zero (0), a corresponding value, as calculated by the controlled variable arithmetic expression 32, will be zero. The command value for each of the controlled variables is, therefore, so set as to keep the latest value of the controlled variable as it is.

The controlled variable corrector 60 determines whether each of the command values for the controlled variables, as derived in the combustion parameter controller 30, lies within a corresponding one of the allowable operation ranges of the actuators 11 or not. The controlled variable corrector 60 corrects or limits one(s) of the command values, as determined to lie outside the allowable operation range, to the upper or lower limit of the corresponding allowable operation range and outputs it in the form of the command signal to the actuator 11.

The allowable operation ranges will be exemplified below. For instance, the fuel injector usually has a limited capacity depending upon the speed at which the fuel injector is opened or closed. Specifically, there is a limitation to a minimum possible amount of fuel the fuel injector can spray in a single injection operation. Consequently, even when the engine control system instructs the fuel injector to spray less than the minimum possible amount, the fuel injector will spray the minimum possible amount of fuel. Additionally, when the amount of fuel to be sprayed in the pilot injection event prior to the main injection event is increased excessively in a multi-injection mode in which the fuel is sprayed several times in each engine operating cycle (i.e., a four-stroke cycle), it may cause the amount of exhaust smoke to exceed an allowable value. It is, thus, necessary to give an upper limit to the amount of fuel to be sprayed in the pilot injection event.

Further, for example, the throttle valve working to regulate the flow rate of air entering the engine 10, the EGR valve working to regulate the EGR amount, and a turbo-valve (e.g., a waste gate valve) working to control the supercharging pressure each have an upper limit that is a maximum possible flow rate of fluid to be discharged when the valve is opened fully. Accordingly, even when the engine control system instructs such valves to output an amount of fluid greater than the upper limit, they will discharge the fluid at the maximum possible flow rate. As apparent from the above, each of the controlled variables has the allowable operation range defined by the upper and lower limits.

How to calculate the command values to be outputted to the actuators 11 to achieve desired values of the controlled variables thereof will be described below with reference to a flowchart of an actuator control program, as illustrated in FIG. 2. This program is to be executed by the microcomputer of the ECU 10*a* at a regular interval (e.g., an operation cycle of the CPU or a cycle equivalent to a given crank angle of the engine 10).

After entering the program, the routine proceeds to step 10 wherein required values of the respective engine output-related values are calculated based on the speed of the engine 10 and the position of the accelerator pedal of the vehicle (i.e., a driver's effort on the accelerator pedal). For example, the ECU 10*a* calculates the required values using a map which is made by the adaptability tests and stores therein optimum values of the engine output-related values in relation to speeds of the engine 10 and positions of the accelerator pedal. The ECU 10*a* may also determine the required values of the engine output-related values as a function of an additional environmental condition or parameter(s) such as the temperature of cooling water for the engine 10, the outside air temperature, and/or the atmospheric pressure.

The routine proceeds to step 20 wherein actual values of the respective engine output-related values are measured from outputs of the engine output sensors 12. The ECU 10*a* may alternatively be designed to estimate or calculate the current engine output-related values through arithmetic models and determine them as the above actual values without use of the engine output sensors 12. Such estimation may be made only on some of the engine output-related values.

The routine proceeds to step 30 wherein the operation of the engine output deviation calculator 40 is executed. Specifically, deviations of the actual values of the engine output-related values measured in step 20 from the required values thereof derived in step 10 are determined. Such deviations will also be referred to as engine output deviations below.

The routine proceeds to step 40 wherein the operation of the integrator 21 is executed. Specifically, a total value x(i) of each of the engine output deviations, as derived in step 30, is determined. More specifically, the sum of each of the total values x(i−1), as derived one program execution cycle earlier, and a corresponding one of the engine output deviations, as derived in this program execution cycle, is calculated as the total value x(i).

The routine proceeds to step 50 wherein the total values x(i), as derived in step 40, are substituted into the combustion parameter arithmetic expression 22. Solutions of the combustion parameter arithmetic expression 22 are determined as amounts by which the current or latest values of the combustion parameters are required to be changed. For instance, the combustion parameter arithmetic expression 22, as illustrated in FIG. 1(*b*), is so designed that the product of an r-order column vector A1 of variables representing amounts by which the current values of the engine output-related values are to be changed and a matrix A2 made up of q-by-r elements $a_{11}$ to aqr is defined as a q-order column vector A3 of variables representing amount by which the combustion parameters are to be changed. The total values x(i) of the deviations, as derived in step 40, are substituted into the variables of the column vector A1 to derive solutions of the respective variables (i.e., entries) of the column vector A3. The solutions are determined as amounts by which the latest values of the combustion parameters are needed to be changed to achieve target values thereof derived in this program execution cycle (which will also be referred to as combustion parameter target changes below).

The routine proceeds to step 60 wherein an output of the combustion condition sensor(s) 13 is monitored to derive actual values of the combustion parameters. The ECU 10*a* may alternatively calculate or estimate current values of the combustion parameters through arithmetic models and determine them as the above actual values without use of the combustion condition sensor 13. Such estimation may be made only on some of the combustion parameters.

The routine proceeds to step 70 wherein the operation of the combustion parameter deviation calculator 50 is performed. Specifically, each of the combustion parameter target changes, as derived in step 50, is added to a reference value thereof to determine a target value. Next, a deviation of each of the target values from a corresponding one of the actual values of the combustion parameters, as derived in step 60, is calculated. Alternatively, a deviation of each of the combustion parameter target changes from a change in actual value of a corresponding one of the combustion parameters may be computed.

The routine proceeds to step 80 wherein the operation of the integrator 31 is performed. Specifically, a total value y(i) of each of the combustion parameter target deviations, as derived in step 70, is determined. More specifically, the sum of the total value y(i−1), as derived one program execution cycle earlier, and the combustion parameter target deviation, as derived in this program execution cycle, is calculated as the total value y(i).

The routine proceeds to step 90 wherein the total values y(i), as derived in step 80, are substituted into the controlled variable arithmetic expression 32. Solutions of the controlled variable arithmetic expression 32 are determined as amounts by which the latest command values for the all types of controlled variables are needed to be changed or regulated. For instance, the controlled variable arithmetic expression 32, as illustrated in FIG. 1(*c*), is so designed that the product of an q-order column vector A3 of variables representing the combustion parameter target changes and a matrix A4 made up of p-by-q elements b11 to bpq is defined as a p-order column vector A5 of variables representing amount by which the controlled variables are to be changed. The total values y(i) of the deviations, as derived in step 80, are substituted into the variables of the column vector A3 to derive solutions of the respective variables (i.e., entries) of the column vector A5. The solutions are determined as amounts by which the latest values of the controlled variables are to be changed to achieve target values thereof (i.e., target command values) derived in this program execution cycle (which will also be referred to as controlled variable target changes below).

The ECU 10*a* also calculates reference command values representing reference values of the controlled variables in addition to the operation in FIG. 2. The ECU 10*a* then corrects the reference command values based on the controlled variable target changes, as derived in step 90, to produce the command values to be outputted to the actuators 11, respectively. For example, the ECU 10*a* adds each of the controlled variable target changes to a corresponding one of the reference command values to derive the command value indicating a target value of the controlled variable. The reference command values may be predetermined as a function of an engine operating condition such as the speed of the engine 10 or calculated in the ECU 10*a* according to a mathematical formula or by look-up using a map based on the engine operating condition. The map is, unlike those taught in Japanese Patent First Publication Nos. 2008-223643 and 2007-77935 referred to in the introductory part of this application, made to provide only the reference command values and thus easy to make with fewer adaptability tests.

The routine proceeds to step 100 wherein it is determined whether each of the command values, as derived in step 90 as being to be outputted to one of the actuators 11, lies within the predetermined allowable operation range or not. If a NO answer is obtained meaning that the command value is out of the allowable operation range, then the routine proceeds to step 110 wherein the command value is corrected or set to the upper or lower limit of the allowable operation range, whichever is closer to the command value. For example, when the command value is greater than the allowable operation range, it is set to the upper limit. The command value thus corrected is then outputted to a corresponding one of the actuators 11 to bring the controlled variable to the required value thereof. Alternatively, if a YES answer is obtained in step 100 meaning that the command value is within the allowable operation range, it is outputted to a corresponding one of the actuators 11 without being corrected. The routine then terminates.

Examples of the correlations between the engine output-related values and the combustion parameters and between the combustion parameters and the controlled variables, as defined by the combustion parameter arithmetic expression 22 and the controlled variable arithmetic expression 32, will be described below with reference to FIGS. 3(*a*) to 3(*c*).

Figures 3A, 3B, 3C:
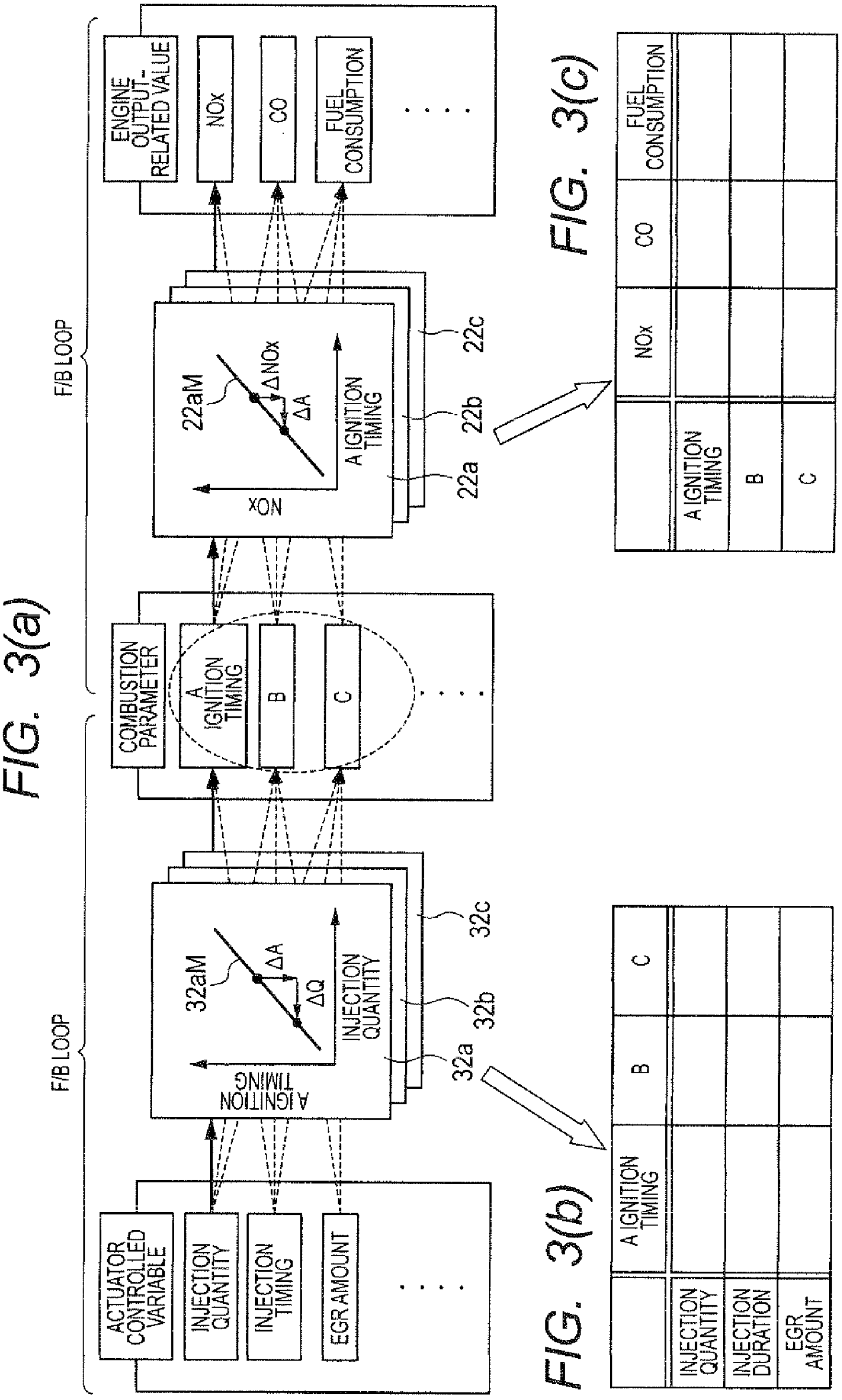
FIG. 3(*a*) is an explanatory view which illustrates correlations, as defined by the combustion parameter arithmetic expression and the controlled variable arithmetic expression in FIGS. 1(*a*) to 1(*c*)

FIG. 3(*a*) illustrates the above correlations schematically. The injection quantity, the injection duration, and the EGR amount are defined as the controlled variables of the actuators 11. The amount of NOx, the amount of CO, and the fuel consumption are defined as the engine output-related values. "A", "B", and "C" represent the different types of combustion parameters, respectively. For instance, "A" indicates the ignition timing in the engine 10.

In the example of FIG. 3(*a*), reference number 32*a* denotes a regression line 32*a*M which represents a correlation between the injection quantity and the combustion parameter A. The regression line 32*a*M is set up by, for example, the multiple regression analysis. Similarly, reference number 32*b* denotes a regression line which represents a correlation between the injection quantity and the combustion parameter B. Reference number 32*c* denotes a regression line which represents a correlation between the injection quantity and the combustion parameter C. Specifically, the correlation, as illustrated in FIG. 3(*b*), between each of the injection quantity, the injection timing, and the EGR amount and one of the combustion parameters A, B, and C is defined by the regression line through the model or the determinant, as described above. Therefore, when combinations of values of the injection quantity, the injection timing, and the EGR amount are specified, corresponding combinations of values of the combustion parameters A, B, and C are obtained. In other words, relations of the controlled variables to the combustion conditions of the engine 10 (i.e., the combustion parameters) are defined. The controlled variable arithmetic expression 32 is, as can be seen in FIG. 1(*a*), defined by a model inverse of that in FIG. 3(*a*).

In FIG. 3(*a*), reference number 22*a* denotes a regression line 22*a*M which represents a correlation between the combustion parameter A and the amount of NOx. The regression line 22*a*M is set up by, for example, multiple regression analysis. Similarly, reference number 22*b* denotes a regression line which represents a correlation between the combustion parameter A and the amount of CO. Reference number 22*c* denotes a regression line which represents a correlation between the combustion parameter A and the fuel consumption. Specifically, the correlation, as illustrated in FIG. 3(*c*), between each of the combustion parameters A, B, and C and one of the amount of NOx, the amount of CO, and the fuel consumption is defined by the regression line through the model or the determinant, as described above. Therefore, when combinations of the combustion parameters A, B, and C are specified, corresponding combinations of the amount of NOx, the amount of CO, and the fuel consumption are obtained. In other words, relations of the combustion conditions of the engine 10 (i.e., the combustion parameters) to the output conditions of the engine 10 (i.e., the engine output-related values) are defined. The combustion parameter arithmetic expression 22 is, as can be seen in FIG. 1(*a*), defined by a model inverse of that in FIG. 3(*a*).

For example, when the target value of the ignition timing A remains unchanged, but the actual value thereof has changed, this difference (i.e., the combustion parameter deviation) is given by the combustion parameter deviation calculator 50. The combustion parameter controller 30 substitutes such a combustion parameter deviation into the model, as indicated in FIG. 3(*b*), or the determinant to derive amounts (i.e., correction values) by which the current values of the injection quantity, the injection timing, and the EGR amount are to be changed or corrected to bring the actual value of the ignition timing A into agreement with the target value thereof.

Taking as an example a correction value ΔQ of the injection quantity (i.e., the amount by which the injection quantity is to be changed), the combustion parameter controller 30 derives the correction value ΔQ which corresponds to a target change ΔA in the ignition timing A based on the regression line 32*a*M in FIG. 3(*a*). The controlled variable arithmetic expression 32 in FIG. 3(*b*) defines the combinations of the combustion parameters and the controlled variables, so that when only one of the combustion parameters has changed from the target value, all the controlled variables are corrected simultaneously.

Similarly, when the required value of the amount of NOx remains unchanged, but the actual value thereof has changed, this difference (i.e., the engine output deviation) is derived by the engine output deviation calculator 20. The combustion parameter calculator 20 substitutes such an engine output deviation into the model, as indicated in FIG. 3(*c*), or the determinant to derive amounts (i.e., correction values) by which the current values of the combustion parameters A, B, and C are to be changed or corrected to bring the actual value of the amount of NOx into agreement with the required value thereof.

Taking as an example a correction value ΔA of the ignition timing (i.e., the amount by which the ignition timing is to be changed), the combustion parameter calculator 20 derives the correction value ΔA which corresponds to a target change ΔNOx in the amount of NOx from the regression line 22*a*M in FIG. 3(*a*). The combustion parameter arithmetic expression 22 in FIG. 3(*c*) defines the combinations of the engine output-related values and the combustion parameters, so that when only one of the engine output-related values has changed from the required value thereof, the target values of all the combustion parameters are corrected simultaneously.

The combustion parameter arithmetic expression 22, as described already, defines the combinations of the engine output-related values and the combustion parameters, thus enabling changes in the respective engine output-related values in response to a change in one of the combustion parameters to be figured out. For instance, when actual values of the amount of NOx and the amount of PM deviate from required values thereof, respectively, as demonstrated in FIG. 4, such deviations are eliminated by changing the latest value of the ignition timing A1 (i.e., the value, as derived one program execution cycle earlier) to the value A2. Even if the value of the ignition timing A needed to bring the amount of NOx and the amount of PM just into agreement with the required values thereof is not found, optimum values which bring both the amount of NOx and the amount of PM as closer to the required values, respectively, as possible may be derived by the combustion parameter arithmetic expression 22.

Figure 4:
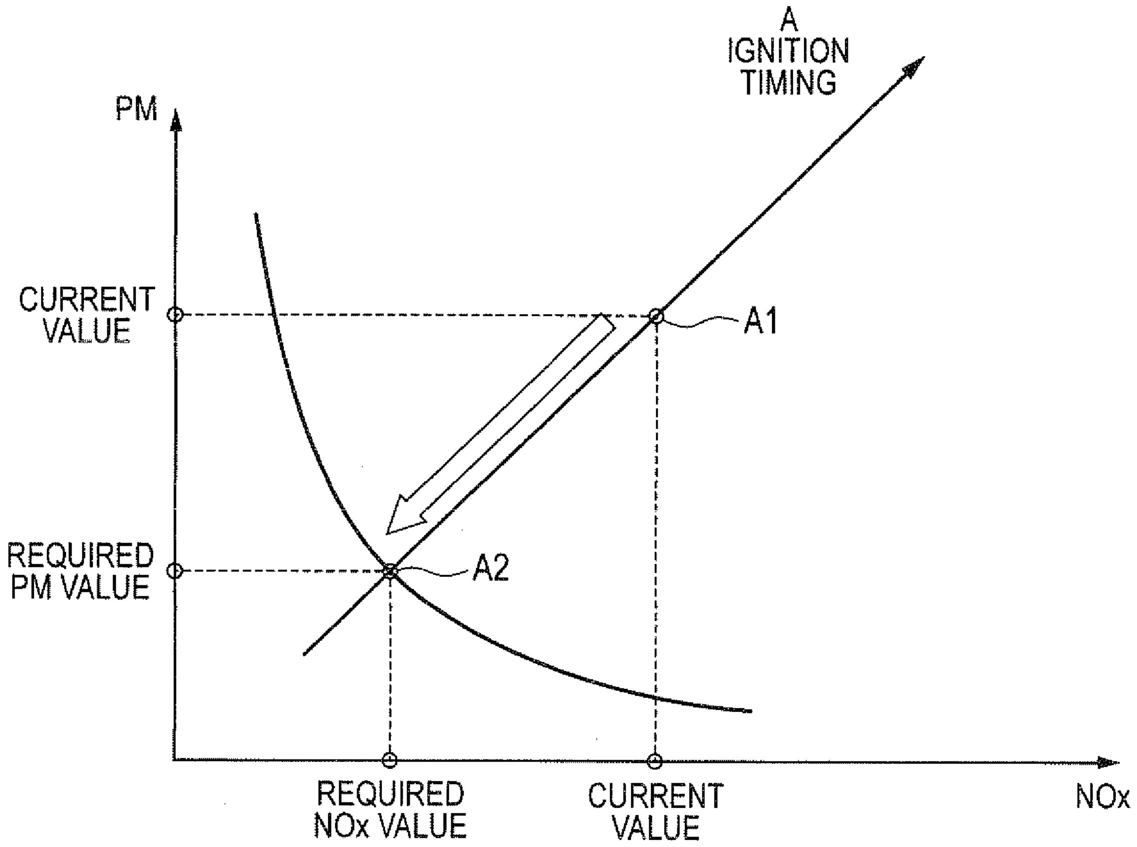
FIG. 4 is an explanatory view which represents effects of a combustion parameter on engine output-related values.
Figure 5A:
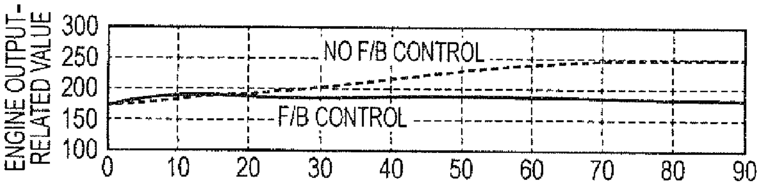
FIG. 5(*a*) is a view which exemplifies a change in engine output-related value.
Figure 5B:
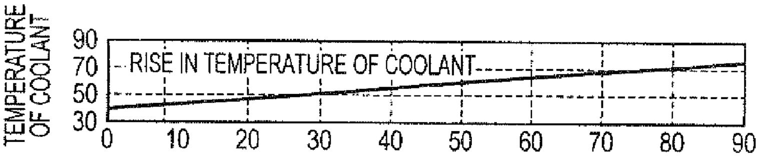
Figure 5C:
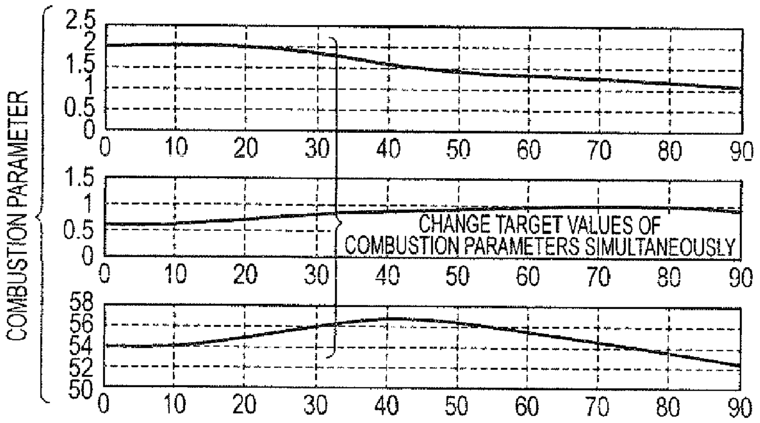
Figure 5D:
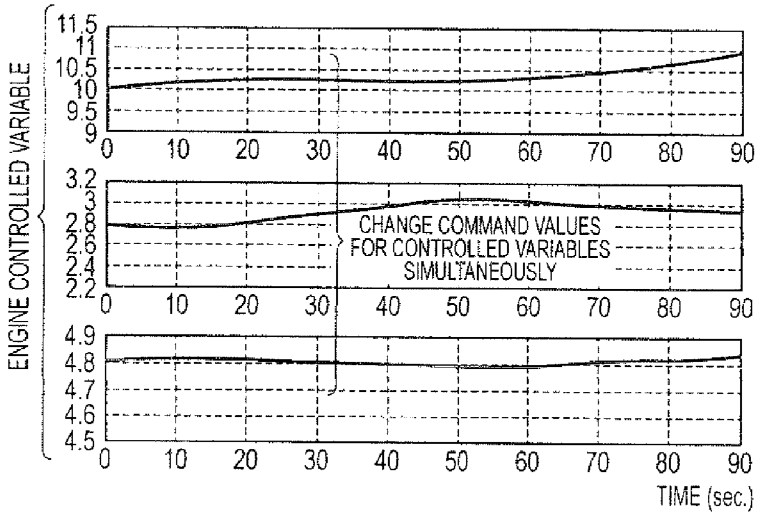

FIG. 4 is a schematic view which demonstrates the correction of only the ignition timing A for the sake of convenience, but however, the combustion parameter arithmetic expression 22 is, as described above, provided to define a given number of all possible combinations of the different types of engine output-related values and the different types of combustion parameters, thus causing the target values of the combustion parameters to be corrected simultaneously in response to one or some of the deviations of the engine output-related values.

Like the combustion parameter arithmetic expression 22, the controlled variable arithmetic expression 32 is prepared to define a given number or all possible combinations of the different types of combustion parameters and the different types of controlled variables, thus causing the command values for the controlled parameters to be corrected simultaneously in response to one or some of the deviations of the combustion parameters.

FIGS. 5(*a*) to 5(*d*) are timing diagrams which demonstrate results of simulations of operations of the engine control system of this embodiment when the temperature of cooling water (i.e., an environmental condition) for the engine 10 has changed during a steady operation of the engine 10.

When the temperature of cooling water is, as illustrated in FIG. 5(*b*), increased gradually, it will cause the combustion conditions of the engine 10 to change even if the controlled variables remain unchanged. The combustion parameter deviation calculator 50 then outputs the combustion parameter deviations. The engine control system changes the current values of the controlled variables in the feedback mode so as to minimize or eliminate the combustion parameter deviations, as derived by the combustion parameter deviation calculator 50. In the illustrated example, the engine control system corrects, as illustrated in FIG. 5(*d*), the current values of the controlled variables simultaneously in response to the change in temperature of cooling water, so that the operations of the actuators 11 are controlled simultaneously in a coordinated way to minimize the combustion parameter deviations as a whole.

Additionally, when the temperature of cooling water is increased gradually, it will also cause the engine output-related values to change even if the combustion conditions of the engine 10 remain unchanged. The engine output deviation calculator 40 then outputs the engine output deviations. The engine control system changes the target values of the combustion parameters in the feedback mode so as to minimize or eliminate the engine output deviations, as derived by the engine output deviation calculator 40. In the illustrated example, the engine control system corrects, as illustrated in FIG. 5(*c*), the target values of the different types of combustion parameters simultaneously in a coordinated way in response to the change in temperature of cooling water to minimize the engine output deviations as a whole.

In short, the engine control system, as illustrated in FIGS. 5(*d*) and 5(*c*), regulates the controlled variables simultaneously and also regulates the combustion parameters simultaneously in the feedback mode to bring the engine output-related value, as indicated by a solid line in FIG. 5(*a*), into agreement with a fixed value. In the case where the engine control system is designed not to perform the above feedback control, for example, to perform open-loop control using an adaptability test-made map representing one-to-one correspondences between the different types of engine output-related values and the different types of controlled variables, the engine output-related value changes, as indicated by a broken line in FIG. 5(*a*), in response to a change in temperature of cooling water for the engine 10. The results of the simulations in FIGS. 5(*a*) to 5(*d*) show that the above feedback control in this embodiment improves the robustness of the engine control system.

Figures 6A, 6B, 6C, 6D, 6E, 6F, 6G:
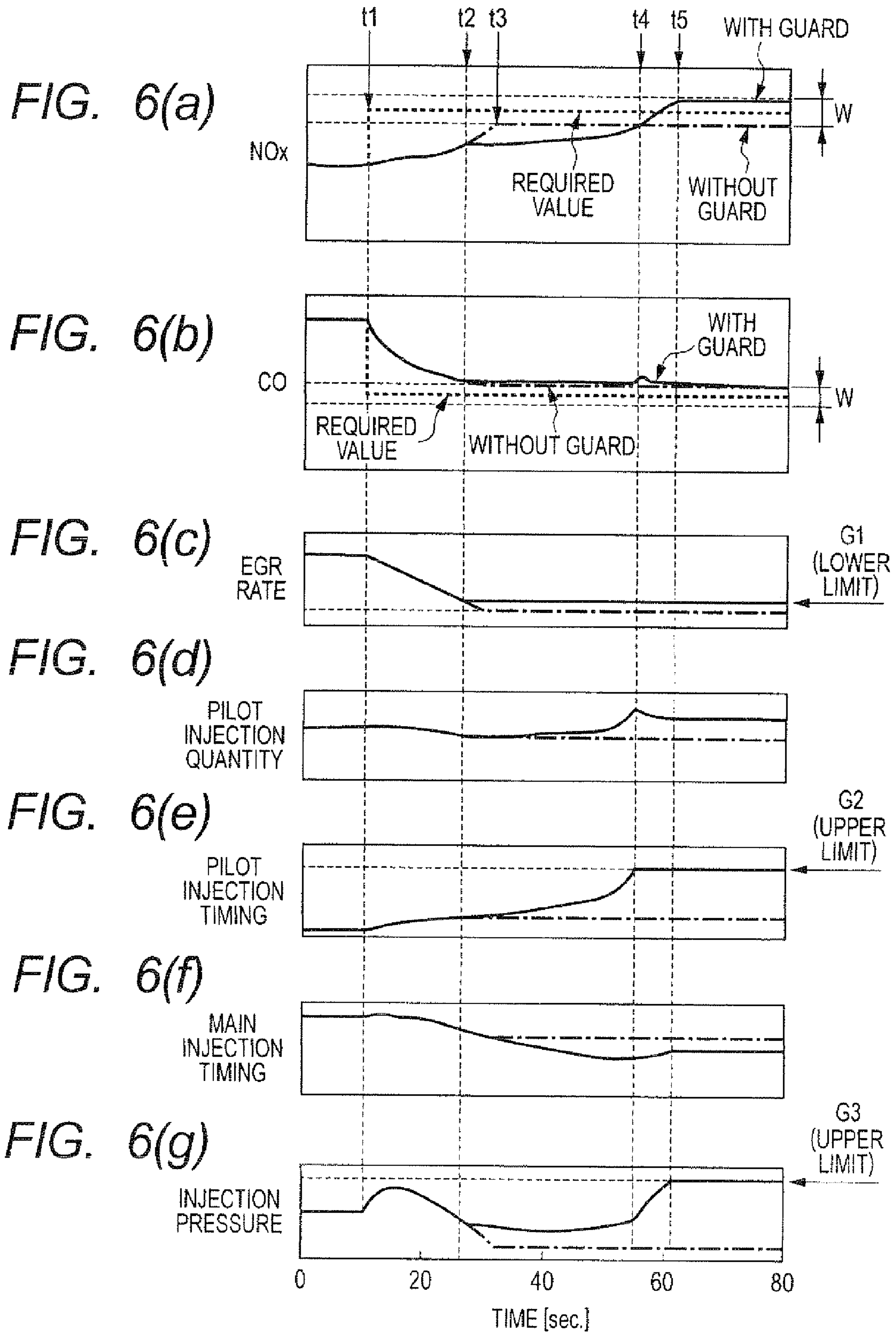
FIG. 6(*a*) is a view which exemplifies a change in required value of amount of NOx.
Figure 7:
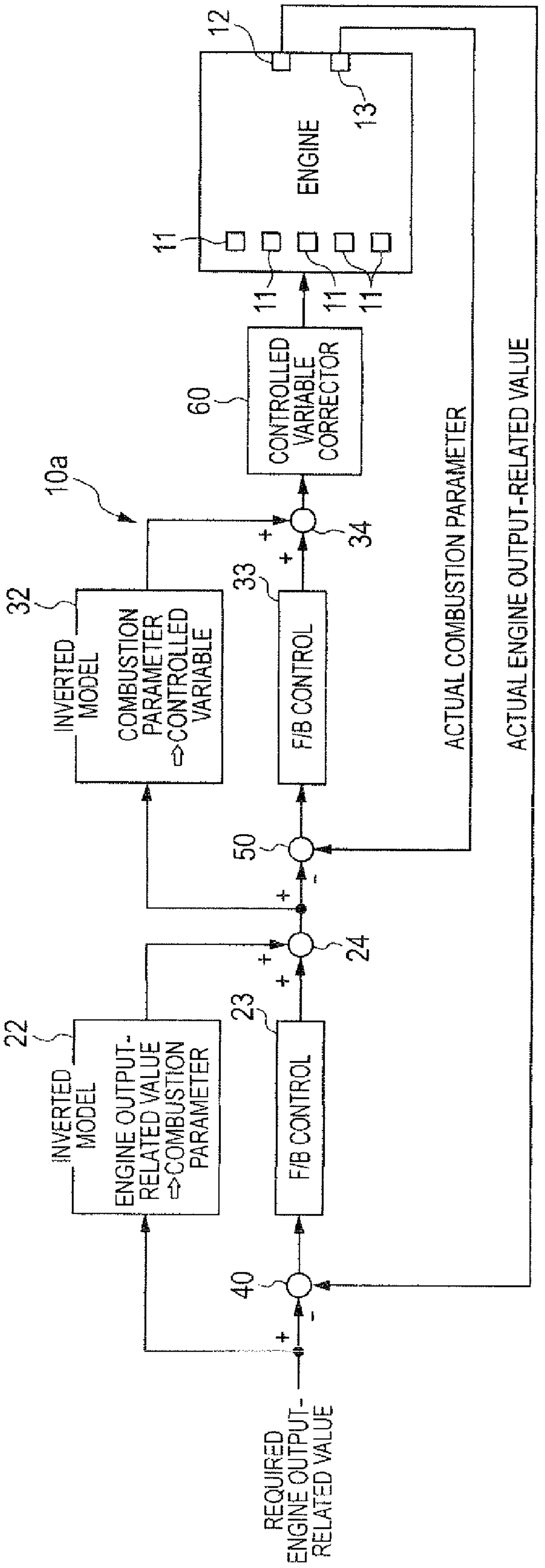
FIG. 7 is a block diagram which shows an engine control system according to the second embodiment.

FIGS. 6(*a*) to 6(*g*) are timing diagrams which demonstrate results of simulations of operations of the engine control system of this embodiment when required values of the amount of NOx and the amount of CO (i.e., the engine output-related values) are changed stepwise.

When required values of the amounts of NOx and CO are, as indicated by broken lines in FIGS. 6(*a*) and 6(*b*), changed stepwise at time t1, it will result in increases in corresponding engine output deviations. The combustion parameter calculator 20 then changes the target values of the combustion parameters. The combustion parameter controller 30, thus, changes the command values for the controlled variables, as demonstrated in FIGS. 6(*c*) to 6(*g*). In the illustrated example, the combustion parameter controller 30 changes the command values for the EGR rate, the quantity of fuel to be sprayed in the pilot injection operation (which will also be referred to as pilot injection quantity), the injection timing in the pilot injection operation (which will also be referred to as pilot injection timing), the injection timing in the main injection operation (which will also be referred to as main injection timing), and the pressure of fuel to be injected into the engine 10 (which will also be referred to as injection pressure).

The command values for the controlled variables are, as illustrated in FIGS. 6(*c*) to 6(*g*), so changed as to bring the combustion parameter deviations closer to zero (0). When the EGR rate reaches its lower limit G1 at time t2, the controlled variable corrector 60 corrects or sets the corresponding command value to the lower limit G1 (see a solid line in FIG. 6(*c*)). After time t2, gains used to correct the controlled variables other than the EGR rate in the feedback mode are, therefore, increased, so that rates of changes in the other controlled variables are, as indicated by solid lines in FIGS. 6(*d*) to 6(*d*), increased.

If the EGR valve is actuated directly by the command value which has been calculated without having to limit the EGR rate, the pilot injection quantity, the pilot injection timing, the main injection timing, and the injection pressure have values, as indicated by dashed lines in FIGS. 6(*d*) to 6(*g*). Actual values of the amounts of NOx and CO are, as indicated by dashed lines in FIGS. 6(*a*) and 6(*b*), stabilized within control dead zones w, respectively, at time t3. This causes all the controlled variables to be also stabilized at time t3.

In the case where the EGR rate is, as indicated by the solid line in FIG. 6(*c*), limited to the lower limit G1 at time t2, the command value for the pilot injection timing to be outputted by the combustion parameter controller 30 is, as indicated by the solid line in FIG. 6(*e*), limited to an upper limit G2 at time t4. This causes gains used in correcting the controlled variables (i.e., the pilot injection quantity, the main injection timing, and the injection pressure) other than the EGR rate and pilot injection timing which have been limited in the feedback mode to be increased, so that rates of changes in the other controlled variables (i.e., the pilot injection quantity, the main injection timing, and the injection pressure) are, as indicated by solid lines in FIGS. 6(*d*), 6(*f*), and 6(*g*), changed after time t4.

Subsequently, the command value for the injection pressure to be outputted by the combustion parameter controller 30 is, as indicated by the solid line in FIG. 6(*g*), limited to an upper limit G3 at time t5. This causes gains used in correcting the controlled variables (i.e., the pilot injection quantity and the main injection timing) other than the limited EGR rate, the pilot injection timing, and the injection pressure which have been limited in the feedback mode to be increased, so that rates of changes in the corrected controlled variables (i.e., the pilot injection quantity and the main injection timing) are, as indicated by solid lines in FIGS. 6(*d*) and 6(*f*), changed at time t5. The actual values of the amounts of NOx and CO are, as indicated by the solid lines in FIGS. 6(*a*) and 6(*b*), stabilized within the control dead zones w at time t5. This causes the all the controlled variables to be stabilized at time t5.

As apparent from the above discussion, when one of the controlled variables is limited to within the allowable operation range, the combustion parameter controller 30 works to regulate the other controlled variables through the controlled variable arithmetic expression 32 in the feedback mode so as to minimize the corresponding combustion parameter deviations, thereby stabilizing the amounts of NOx and CO within the control dead zones w.

The engine control system of this embodiment offers the following advantages.

1) There is a concern, as described above, that any of the command values for the controlled variable, as derived through the combustion parameter calculator 20 and the combustion parameter controller 30 lies out of the allowable operation range thereof. In order to alleviate such a concern, the engine control system of this embodiment works to limit the command value which is produced by the combustion parameter controller 30 and lies out of the allowable operation range to the upper or lower limit of the allowable operation range through the controlled variable corrector 60. This improves the system controllability to bring the engine output-related values close to the required values simultaneously.

The engine control system continues to correct the command values for the controlled variables based on the actual or calculated values of the combustion parameters until the combustion parameter deviations decrease to zero (0). Therefore, even when one or some of the controlled variables are limited to the allowable operation ranges thereof, the engine control system functions to regulate the other controlled variables simultaneously in the coordinated manner to bring the actual values of the combustion parameters close to target values thereof, thereby adjusting the engine output-related values close to the required values thereof simultaneously.

2) If one of the actuators 11 has failed to operate properly, so that it has become impossible to change a corresponding one of the controlled variables, the engine control system controls the actual or calculated values of the combustion parameters in the feedback mode, so that the command values for the controlled variables continue to be corrected until the combustion parameter deviations become zero (0). This causes the other controlled variables for the actuators 11 operating properly to be adjusted in the coordinated manner to bring the actual values of the combustion parameters into agreement with the target values, thereby bringing the engine output-related values close to the required values, respectively.

3) The combustion parameter arithmetic expression 22 is designed to define the correlations between the different types of engine output-related values and the different types of combustion parameters, thereby figuring out how to control the combustion conditions of the engine 10 to achieve the required engine output-related values. Specifically, the engine control system works to determine a combination of target values of the combustion parameters through the combustion parameter arithmetic expression 22 so as to minimize the deviations of actual values of the engine output-related values from required values thereof and realize the required engine output-related values in view of the fact that the different types of combustion parameters mutually interfere with one of the engine output-related values. This results in improvement in bringing the engine output-related values closer to the required values simultaneously.

4) The controlled variable arithmetic expression 32 is designed to define the correlations between the different types of combustion parameters and the different types of controlled variables, thereby figuring out how to control the combustion conditions of the engine 10 to achieve desired output conditions of the engine 10. Specifically, the engine control system works to determine a combination of the controlled variables through the controlled variable arithmetic expression 32 so as to minimize the deviations of actual values of the combustion parameters from target values thereof, thereby avoiding the deterioration of engine controllability arising from the mutual interference of the different types of controlled variables with one of the combustion parameters. This results in improvement in bringing the combustion parameters closer to the target values simultaneously.

5) The engine control system, as described above, has the combustion parameter arithmetic expression 22 and the controlled variable arithmetic expression 32 for use in selecting a combination of target values of the combustion parameters required to achieve required values of the engine output-related values and a combination of command values for the controlled variables needed to achieve target values of the combustion parameters, thereby eliminating the adaptability tests to find optimum values of such combinations, respectively, which results in a reduction in burden of the adaptability test work and the map-making work on the control system manufacturer and also permits the capacity of the memory needed to store the maps in the ECU 10*a* to be decreased.

Particularly, the acquisition of optimum values of the above combinations for each of the environmental conditions through the adaptability tests usually results in a great increase in number of the adaptability tests. The engine control system of this embodiment, however, improves the robustness against a change in environmental condition, as already discussed in FIGS. 5(*a*) to 5(*d*), through the feedback control, as described below in 4) and 5), thus eliminating the need for preparing the combustion parameter arithmetic expression 22 and the controlled variable arithmetic expression 32 for each of the environmental conditions, which also reduces the burden on the control system manufacturers.

6) The engine control system sets the controlled variables of the actuators 11 simultaneously in the coordinated manner so as to bring actual or calculated values of the control parameters into agreement with target values thereof in the feedback modes, thereby minimizing deviations of the different types of combustion conditions of the engine 10 from target conditions which arise from a change in environmental condition such as the temperature of cooling water for the engine 10. This improves the robustness of the combustion parameter controller 30 against the change in environmental condition in controlling the combustion conditions of the engine 10.

7) The engine control system sets the target values of the different types of combustion parameters simultaneously in the coordinated manner so as to bring actual or calculated values of the engine output-related values into agreement with required values thereof in the feedback modes, thereby minimizing deviations of the different types of engine output-related values from the target values which arise from a change in environmental condition such as the temperature of cooling water for the engine 10. This improves the robustness of the combustion parameter calculator 20 against the change in environmental condition in calculating the target values of the combustion parameters needed to meet the required values of the engine output-related values.

8) The improvement of the robustness against a change in environmental condition eliminates the need for reflecting the environmental condition, as measured by, for example, a coolant temperature sensor, in controlling the engine 10. This permits one or more environmental condition sensors to be omitted.

9) Usually, it is very complicated to define the correlations between the different types of engine output-related values and the different types of controlled variables of the actuators 11 directly. In other words, it is very difficult to find the regression lines 32$a$M, as illustrated in FIG. 3($a$), experimentally. It is, however, relatively easy to obtain the correlations between the engine output-related values and the combustion parameters and between the combustion parameters and the controlled variables of the actuators 11. In light of this fact, the engine control system of this embodiment uses the combustion parameter arithmetic expression 22 and the controlled variable arithmetic expression 32 to define the correlations between the engine output-related values and the controlled variables through the combustion parameters as intermediate parameters, thereby facilitating the ease of acquiring data on the regression lines 22$a$M and 32$a$M used in making the combustion parameter arithmetic expression 22 and the controlled variable arithmetic expression 32.

10) The engine control system works to control the actual or calculated values of the engine output-related values in the feedback mode where the combustion parameters are employed as the intermediate parameters and also to control actual or calculated values of the intermediate parameters (i.e., the combustion parameters) in the feedback mode, thus resulting in improved robustness against a change in environmental condition in controlling the engine 10 through the combustion parameter controller 30 and the combustion parameter calculator 20.

FIG. 6 illustrates an engine control system of the second embodiment of the invention.

The engine control system of the first embodiment is designed to calculate the reference command values independently of the control task in FIG. 2 and determine the solutions derived by substituting the combustion parameter deviations into the controlled variable arithmetic expression 32 as amounts by which the reference command values are to be corrected. In contrast, the engine control system of the second embodiment in FIG. 6 determines the solutions derived by substituting the target values of the combustion parameters into the controlled variable arithmetic expression 32 as the reference command values and also calculates amounts by which the reference command values are to be corrected in the feedback mode based on the combustion parameter deviations in a feedback controller 33. The engine control system uses the reference command values, as derived by the controlled variable arithmetic expression 32, and the amounts of correction, as derived by the feedback controller 33, to produce the command values to be outputted directly to the actuators 11 through a command value calculator 34.

The engine control system of the first embodiment calculates the reference target values of the combustion parameters independently of the control task in FIG. 2 and determines the solutions derived by substituting the engine output deviations into the combustion parameter arithmetic expression 22 as amounts by which the reference target values are to be corrected in the feedback mode. In contrast, the engine control system of the second embodiment determines the solutions derived by substituting the required values of the engine output related values into the combustion parameter arithmetic expression 22 as the reference target values and calculates amounts by which the reference target values are to be corrected in the feedback mode based on the engine output deviations in the feedback controller 23. The engine control system uses the reference target values, as derived by the combustion parameter arithmetic expression 22, and the amounts of correction, as derived by the feedback controller 23, to produce in a target value calculator 24 the target values of the combustion parameters to be outputted directly to the controlled variable arithmetic expression 32 and the feedback controller 33.

The engine control system of the second embodiment serves to control the combustion parameters and the actual or calculated values of the engine output-related values in the same coordinated feedback mode as in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For instance, the engine control system may be designed to control the actuators 11 in a manner in which some of the features in the first and second embodiments are combined.

The engine control system in each of the first and second embodiments controls the actual or calculated values of the combustion parameters and the engine output-related values in the feedback mode, however, may alternatively be designed to control at least one of the former and the latter in the open-loop mode. For instance, the feedback controller 23, the target value calculator 24, and the engine output deviation calculator 40, as illustrated in FIG. 6, are omitted. The engine control system outputs the reference target values, as derived by the combustion parameter arithmetic expression 22, directly to the combustion parameter controller 30. Alternatively, the feedback controller 33, the command value calculator 34, and the combustion parameter deviation calculator 50 are omitted. The engine control system outputs the reference command values, as derived by the controlled variable arithmetic expression 32, directly to the actuators 11.

The engine control system in each of the first and second embodiments may be constructed to replace either one of the combustion parameter arithmetic expression 22 and the controlled variable arithmetic expression 32 with the following map. A map in which optimum values of the combustion parameters are stored for each of the required values of the engine output-related values may be replaced with the combustion parameter arithmetic expression 22. A map in which optimum values of the controlled variables are stored for each of the target values of the combustion parameters may alternatively be replaced with the controlled variable arithmetic expression 32.

The engine control system may be equipped with a sensor which measures an environmental condition such as the temperature of cooling water or coolant for the engine 10 to correct the target values of the combustion parameters, as calculated by the combustion parameter calculator 20, and/or the command values of the controlled variables, as calculated by the combustion parameter controller 30, based on the measured environmental condition.

What is claimed is:

1. An engine control apparatus which controls operations of actuators to control combustion conditions in an engine, thereby controlling output characteristics of the engine, comprising:

a storage unit for storing a controlled variable arithmetic expression defining correlations between a plurality of types of combustion parameters representing the combustion conditions and a plurality of types of controlled variables for said actuators and a combustion parameter arithmetic expression defining correlations between a plurality of types of engine output values representing said output characteristics and said plurality of types of combustion parameters;

a controlled variable command value calculating unit for calculating combinations of command values of said plurality of controlled variables with target values of said plurality of types of combustion parameters based on the target values of said plurality of types of combustion parameters and said controlled variable arithmetic expression;

a combustion target value calculating unit for calculating combinations of the target values of said plurality of types of combustion parameters with required values of said plurality of types of engine output values based on the required values of said plurality of types of engine output values and said combustion parameter arithmetic expression, the required values of said plurality of types of engine output values comprising the optimum of said plurality of types of engine output values based on at least a speed of the engine and a position of an accelerator pedal of the engine;

a combustion parameter feedback unit for feeding deviations of actual values or calculated values of said combustion parameters from the target values of the combustion parameters back to calculation of the command values of the controlled variables;

an engine output value feedbacking unit for feeding deviations of actual values or calculated values of said engine output values from the required values of said engine output values back to calculation of the target values of the combustion parameters; and a controlled variable restricting unit which, when the command values of said controlled variables calculated by said controlled variable command value calculating unit lie out of a given usable range, restricts said command values to an upper or a lower limit of said usable range, characterized in that even when said controlled variable restricting unit has restricted the command values, said combustion parameter feedback unit updates the unrestricted command values.

2. An engine control apparatus as set forth in claim 1, wherein said engine output values represent at least two of a physical quantity associated with an exhaust emission, a physical quantity associated with an output torque, a physical quantity associated with a fuel consumption, and a physical quantity associated with combustion noise.

* * * * *